United States Patent Office 3,261,723
Patented July 19, 1966

3,261,723
METHOD FOR REDUCING COMBUSTION CHAMBER DEPOSITS IN INTERNAL COMBUSTION ENGINES
Willis G. Craig, Willoughby, Ohio, assignor to The Lubrizol Corporation, Wickliffe, Ohio, a corporation of Ohio
No Drawing. Filed Nov. 30, 1962, Ser. No. 241,156
6 Claims. (Cl. 148—6.15)

The present invention relates, as indicated, to a method for reducing combustion chamber deposits in internal combustion engines. It relates particularly to a method for so reducing such deposits in spark ignition engines. The accumulation of deposits, particularly in the combustion chamber head of a spark ignition engine produces many undesirable results and it is accordingly very desirable to prevent or at least diminish such accumulation. One such result is an increase in the octane requirement of an engine. Thus upon the accumulation of an appreciable amount of such deposits an engine will require a gasoline having an increased octane number. This is, of course, undesirable because the cost of gasoline varies directly with its octane number.

During operation of the engine, the accumulation of combustion deposits in the combustion chamber head acts to increase the compression ratio and thereby necessitates the use of a fuel of higher octane number than the original fuel if knocking is to be avoided. The octane requirement of a deposit-laden engine is known as the "equilibrium octane requirement" of that engine, and this can be determined by means of a full-scale engine test.

Present-day spark ignition engines having compression ratios of from about 7.5:1 to as high as 12:1 are particularly sensitive to the adverse effects associated with combustion chamber deposits. In some instances the accumulation of these deposits causes such a high equilibrium octane requirement that even the best high octane gasoline or "premium fuel" available commercially fails to eliminate knocking. The only recourse in such severe cases is to remove the engine head and scrape off the offending deposits.

Another harmful effect of combustion chamber deposits is that they tend to cause pre-ignition of the fuel, with the accompanying loss of engine power and the development of an engine noise commonly referred to as "wild ping."

The problems of high equilibrium octane requirement and pre-ignition are serious ones which have occupied considerable attention on the part of both the petroleum and automotive industries. Although the use of high quality fuels and lubricants has been found to have a slightly beneficial effect, the problems have heretofore remained largely unsolved.

It is an object of the present invention, therefore, to provide a method whereby the formation and accumulation of deleterious combustion chamber deposits in internal combustion engines can be reduced substantially.

A further object is to provide a method for combatting the problems of high equilibrium octane requirement and pre-ignition associated with the operation of spark ignition internal combustion engines.

These and other objects of the invention are achieved in the manner described hereinafter.

According to the present invention the formation and accumulation of harmful deposits in the ferrous metal combustion chamber head of an internal combustion engine are reduced substantially by the method which comprises treating said combustion chamber head with an aqueous phosphating solution having a total acidity of at least about 5 points and containing as an essential ingredient the phosphate ion to form thereon an integral phosphate coating of at least about 25 milligrams per square foot of surface area. In most instances the aqueous phosphating solution will also contain a metallic ion selected from the group consisting of manganese, sodium, and nickel ions and have a total acidity within the range from about 5 to about 300 points.

In a more particular sense, the invention relates to a method for reducing substantially the formation and accumulation of deposits in the ferrous metal combustion chamber head of a spark ignition internal combustion engine, which method comprises treating said combustion chamber head with an aqueous phosphating solution having a total acidity within the range of from about 5 to about 100 points and containing as essential ingredients from about 0.1 to about 1.5 percent by weight of manganese ion and from about 0.5 to about 8 percent by weight of phosphate ion to form thereon an integral phosphate coating of at least about 25 milligrams per square foot of surface area.

In a more particular sense, the invention also relates to a method for reducing substantially the formation and accumulation of deposits in the ferrous metal combustion chamber head of a spark ignition internal combustion engine, which method comprises treating said combustion chamber head with an aqueous phosphating solution having a total acidity within the range of from about 5 to about 100 points and containing as essential ingredients from about 0.05 to about 0.5 percent of sodium ion and from the 0.5 to about 5 percent of phosphate ion to form thereon an integral phosphate coating of at least about 25 milligrams per square foot of surface area.

In the usual practice of the invention, the ferrous metal combustion chamber is cleaned by physical and/or chemical means to remove any grease, dirt, or oxides and then it is phosphated by means of an aqueous phosphating solution which contains as an essential ingredient the phosphate ion to form thereon the desired inorganic phosphate coating. Such phosphate coatings, which are widely used in the metal finishing industry to inhibit oxidation or rusting and to form an adherent substrate for the subsequent application of organic coating compositions such as paint, varnish, enamel, lacquer, synthetic resins, etc., are generally formed on a metal surface by means of aqueous solutions which contain the phosphate ion and, optionally, certain auxiliary ions including metallic ions of light or heavy metals such as sodium, manganese, vanadium, tungsten, iron, copper, lead, nickel, cobalt, and antimony, and non-metallic ions such as ammonium, borate, chloride, fluoride, bromide, nitrate, and chlorate ions. These auxiliary ions modify the character of the phosphate coating and adapt it for a wide variety of applications. The preparation and use of aqueous phosphating solutions is well-known in the metal finishing industry as shown, for example, by U.S. Patents 1,206,075, 1,247,668, 1,305,331, 1,485,025, 1,610,362, 1,980,518, 2,001,754, and 2,859,145. Especially useful for the purposes of the present invention are aqueous phosphating solutions which contain at least one metallic ion selected from the group consisting of manganese, sodium, and nickel ions.

3

Aqueous phosphating solutions are generally prepared by dissolving in water minor amounts of phosphoric acid and, optionally, a metal salt such as a nitrate, phosphate, nitrite, sulfate, chloride, or bromide of manganese, sodium, iron, nickel, copper, lead, or antimony. Ordinarily an oxidizing agent such as sodium chlorate, potassium perborate, sodium nitrate, ammonium nitrate, sodium chlorite, or potassium perchlorate is included in the phosphating solution to depolarize the metal surface being treated and thereby increase the rate at which the phosphate coating is formed on the metal surface. Other auxiliary agents such as anti-sludging agents, coloring agents, wetting agents, and metal cleaning agents may also be incorporated in the phosphating solution. One common type of commercial phosphating bath which contains manganese ion, phosphate ion, and a depolarizing agent is made by dissolving small amounts of manganous dihydrogen phosphate, sodium nitrate, and phosphoric acid in water.

In order to provide commercially satisfactory coating weights and coating speeds, an aqueous phosphating solution should generally have a total acidity of at least about 5 points, preferably from about 5 to about 50 or 100 points. It is possible, however, by certain special techniques to employ phosphating solutions having a total acidity substantially higher than 100 points, e.g., 125, 200, 250, or 300 points or more. The term "points total acidity" as employed in the phosphating art represents the number of milliliters of 0.1 normal sodium hydroxide solution required to neutralize a 10 milliliter sample of a phosphating solution in the presence of phenolphthalein as an indicator.

In view of the extensive commercial development of the phosphating art and the many journal publications and patents describing the application of phosphating solutions, it is believed unnecessary to lengthen this specification unduly by a detailed recitation of the many ways in which the phosphating step may be accomplished. Suffice it to say that any of the commonly used phosphating techniques such as spraying, brushing, dipping, roller-coating, or flow-coating may be employed, and that the temperature of the aqueous phosphating solutions may vary within wide limits, e.g., from room temperature to about 212° F. In general, best results are obtained when the phosphating solution is used at a temperature within the range from about 150° F. to about 210° F. If desired, however, the aqueous phosphating bath may be used at higher temperatures, e.g., 225° F., 250° F., or even 300° F., by employing superatmospheric pressures.

The phosphating operation is usually carried out until the weight of the phosphate coating formed on the combustion chamber head is at least about 25 mg. per square foot of surface area and is preferably within the range from about 50 or 100 to about 1000 mg. per square foot of surface area. The time required to form the phosphate coating will vary according to the temperature, the type of phosphating solution employed, the particular technique of applying the phosphating solution, and the coating weight desired. In most instances, however, the time required to produce a phosphate coating of the weight preferred for the purposes of the present invention will be within the range from about 5 seconds to about 20 or 30 minutes.

Upon completion of the phosphating operation, the phosphated combustion chamber head may be rinsed, if desired, with water and/or a hot, dilute aqueous solution of chromic acid containing from about 0.01 to about 0.2 percent of $CrO_3$. The chromic acid rinse appears to "seal" the phosphate coating and improve its rust inhibiting characteristics. In lieu of the dilute aqueous chromic acid, dilute aqueous solutions of metal chromates, metal dichromates, chromic acid-phosphoric acid mixtures, and chromic acid-metal dichromate mixtures may be usde.

Specific illustrations of aqueous phosphating solutions which are well adapted for the purposes of this invention are given in Table I (except for the "Points Total Acid," all the values are percentages by weight of the indicated ions in the phosphating solution).

TABLE I.—PHOSPHATING SOLUTION

| Ion | A* | B | C | D |
| --- | --- | --- | --- | --- |
| Mn | | 1.32 | 0.14 | 0.27 |
| Na | 0.11 | | | |
| Fe++ | | 0.2 | | |
| $PO_4$ | 2.98 | 4.9 | 1.97 | 1.15 |
| $ClO_3$ | 0.4 | | | |
| $NO_3$ | | 0.68 | 0.14 | |
| $NH_4$ | 0.56 | | | |
| Cu | | | 0.002 | |
| Ni | | 0.035 | | |
| Points total acid | 33 | 70 | 60 | 35 |

*Also contains 0.075% each of two different proprietary wetting agents.

The aqueous phosphating solutions set forth in Table I may be prepared as follows:

*Solution A.*—4.8 ounces of ammonium dihydrogen phosphate, 0.67 ounce of sodium chlorate, and 0.1 ounce each of two different proprietary wetting agents (Triton X–114, which is an isooctyl phenyl polyethoxy ethanol, and Miranol HM, which is the disodium salt of 1-(2-hydroxyethyl)-1-carboxymethyl - 2 - hendecylimidazolinium hydroxide) are dissolved in sufficient water to yield 1 gallon of solution.

*Solution B.*—Nine ounces of 75 percent phosphoric acid, 1.24 ounces of 67 percent nitric acid, 3.7 ounces of manganese carbonate, and 0.23 ounce of nickel nitrate hexahydrate are added to 1 pint of water. The whole is thoroughly mixed and then diluted with additional water to yield one gallon of solution. Then 0.8 ounce of steel wool is introduced into the solution and "worked" for 20 minutes at 190° F. to introduce 0.2 percent ferrous ion into the solution. The steel wool is then removed and the phosphating solution is ready for use.

*Solution C.*—A concentrate is first made by dissolving 1.75 pounds of manganous dihydrogen phosphate, 5.0 pounds of 85 percent phosphoric acid, 0.5 pound of sodium nitrate, and 0.016 pound of cupric nitrate in sufficient water to yield 1 gallon of concentrate. This concentrate is then diluted with 32 gallons of water to yield the desired phosphating solution.

*Solution D.*—2.35 pounds of manganese carbonate is allowed to react with a mixture of 0.5 gallon each of water and 75 percent phosphoric acid. After the evolution of carbon dioxide has subsided, the whole is diluted with sufficient water to yield 50 gallons of the desired phosphating solution.

It should be noted that the ions of the aqueous phosphating solution used for the purposes of this invention may be derived from a variety of salts, acids, and bases. It is necessary only that such salts, acids, or bases be used in amounts to supply the required phosphate ion and the desired auxiliary ions.

The following examples are presented to illustrate specific modes of practicing the present invention. They are submitted for purposes of illustration only and are not to be construed as limiting the scope of the present invention, except as the latter is defined by the appended claims. The effectiveness of the method of the present invention in reducing the formation and accumulation of deposits in the combustion chamber heads of internal combustion engines in clearly shown in these examples.

*Example 1*

A pair of combustion chamber heads for a 1956 model Cadillac V–8 engine (from the General Motors Corporation) were thoroughly cleaned by immersing them for about 10 minutes in a hot (200–210° F.) aqueous cleansing bath compounded from water and 8 ounces per gallon of an aqueous alkaline cleaning composition. The heads were removed from the bath, washed with cold water, and phosphated by immersing them in phosphating solution A (contains sodium, phosphate, chlorate, and ammonium ions) for about 6 minutes at 200–210° F. The phosphated heads were then removed from the phosphating solution and rinsed with cold water. The coating weight on the phosphated heads averaged about 150 milligrams per square foot of surface area.

The phosphated heads were affixed to a 1956 Cadillac V–8 engine equipped with a General Motors Hydramatic transmission, the output of the transmission being coupled to an eddy current dynamometer and an automatic cycling apparatus. The following cycle of engine operation was repeated continuously over a period of 157 hours:

(1) 15 seconds' operation at idling speed, followed by
(2) 45 seconds' operation at higher speeds, viz., acceleration through the normal shift changes of the Hydramatic transmission, reaching a terminal engine speed of 2000 r.p.m., at which point the engine develops approximately 56 horsepower in fourth gear.

The engine fuel used in the test was a standard commercial brand of premium grade leaded gasoline. A similar engine test was carried out using conventional (i.e., not phosphated) combustion chamber heads.

After the tests were completed, the heads were removed and the deposits were carefully and completely scraped from the combustion chambers and weighed. The heads which had been phosphated contained 47.3 grams of deposits, whereas the conventional heads contained 51.3 grams of deposits. Thus, the phosphated heads contained 7.8 percent fewer deposits.

*Example 2*

To measure the extent to which the phosphate coating of combustion chamber heads lowers the equilibrium octane requirement of a spark ignition engine, conventional engine heads and phosphated engine heads were compared in a full-scale engine test entitled, "Cadillac V–8 Cycling Test for Evaluating Equilibrium Octane Requirement." The phosphating of the engine head was carried out in the same manner set forth in Example 1.

The Cadillac V–8 Cycling test employs a 1958 Cadillac V–8 engine of 365 cubic inches' displacement and 10.25:1 compression ratio from which the oil filter and automatic choke have been removed and to which is coupled directly an eddy current dynamometer. The engine is operated on commercial premium grade leaded gasoline under the conditions set forth in Table II for a total of 132 hours, the octane requirement being determined after 60, 84, 108, and 132 test hours by comparison with standard, calibrated octane number reference fuels (known mixtures of isooctane and normal heptane).

TABLE II.—ENGINE OPERATING CONDITIONS

| Test Cycle Time, minutes* | Engine Speed (r.p.m.) | Dynamometer load (lbs.) | Oil Temperature (° F.) | Head Temperature (° F.) | Air: Fuel Ratio |
|---|---|---|---|---|---|
| 3 | 1,400 | 33 | 185–187 | 167–173 | 13:1 to 13.5:1. |
| 1 | 500 | Idle, no load | | | |

*This cycle of operation is continuously repeated by means of appropriate automatic controls The octane requirement determination referred to above is carried out by observing when knocking first becomes perceptible with standard reference fuel under the engine operation conditions set forth in Table III.

TABLE III.—SPECIAL ENGINE OPERATING CONDITIONS FOR KNOCK EVALUATION

Engine speed _____ 1500 r.p.m.
Intake manifold vacuum ___ 10″ Hg.
Ignition timing _____ 14° before top dead center.
Head temperature _____ 180–184° F.

The average of the four octane requirement determinations referred to above is taken as the equilibrium octane requirement.

When this test was carried out using an engine fitted with conventional heads, the equilibrium octane requirement was found to be 86.9. The same test, when conducted using an engine fitted with heads which had been phosphated with solution A in the manner previously described, gave an equilibrium octane requirement of 86.4, or 0.5 octane number lower than the value obtained on the engine having conventional heads.

*Example 3*

An experiment similar to that set forth in Example 1 was carried out with the following exceptions:

(a) Solution B (contains manganese, nickel, phosphate, and nitrate ions) was used in lieu of solution A; and
(b) the phosphating operation was effected at 190° F. for a period of 20 minutes.

After the combustion chamber deposit tests were completed, it was noted that the combustion chamber heads which had been phosphated contained 15.5 percent fewer deposits than the conventional heads.

*Example 4*

An experiment similar to that set forth in Example 2 was carried out, except for the differences (a) and (b) noted in Example 3. The equilibrium octane requirement for the engine which had been fitted with phosphated heads was found to be 0.51 octane number lower than for the engine which had been fitted with conventional heads.

It will be noted that best results from the standpoint of both reduction of combustion chamber deposits and lowering of the equilibrium octane requirement were obtained when the phosphating operation was carried out by means of a solution containing manganese, nickel, phosphate, and nitrate ions.

The economic significance of even a fractional reduction in the octane requirement of engines is considerable. It has been estimated that the cost to the petroleum industry of raising the octane rating of gasoline by one octane number is of the order of one-hundred forty million dollars per year.

It is not known how the phosphate coating on the combustion chamber head acts to reduce the formation and accumulation of deposits. It may be that the deposits adhere less firmly to the phosphated surface than to the conventional ferrous surface, or it may be that the phosphate coating in some manner yet unrecognized catalyzes the oxidation of deposits, causing them to burn away.

Certain modifications in the method of this invention will be apparent to one skilled in the art and, therefore, the invention is not to be construed as limited to the specific description thereof set forth in this specification, except as required by the appended claims.

What is claimed is:

1. A method for reducing the formation and accumulation of deposits in the ferrous metal combustion chamber head of an internal combustion engine, which method comprises treating said combustion chamber head with an aqueous phosphating solution having a total acidity within the range of from about 5 to about 300 points and containing as essential ingredients the phosphate ion and a metallic ion selected from the group consisting of manganese, sodium, and nickel ions to form thereon an integral phosphate coating of at least about 25 milligrams per square foot of surface area.

2. A method in accordance with claim 1 further characterized in that the metallic ion is manganese.

3. A method in accordance with claim 1 further characterized in that the metallic ion is sodium.

4. A method for reducing the formation and accumulation of deposits in the ferrous metal combustion chamber head of a spark ignition internal combustion engine, which method comprises treating said combustion chamber head with an aqueous phosphating solution having a total acidity within the range of from about 5 to about 100 points and containing as essential ingredients from about 0.1 to about 1.5 percent of manganese ion and from about 0.5 to about 8 percent of phosphate ion to form thereon an integral phosphate coating of at least about 25 milligrams per square foot of surface area.

5. A method for reducing the formation and accumulation of deposits in the ferrous metal combustion chamber head of a spark ignition internal combustion engine, which method comprises treating said combustion chamber head with an aqueous phosphating solution having a total acidity within the range of from about 5 to about 100 points and containing as essential ingredients from about 0.05 to about 0.5 percent of sodium ion and from about 0.5 to about 5 percent of phosphate ion to form thereon an integral phosphate coating of at least about 25 milligrams per square foot of surface area.

6. A method in accordance with claim 1 wherein the ferrous metal combustion chamber head is treated with the aqueous phosphating solution at a temperature within the range of from about 150° F. to about 210° F. for a period of from about 5 seconds to about 30 minutes.

References Cited by the Examiner
UNITED STATES PATENTS

| | | | |
|---|---|---|---|
| 1,559,439 | 10/1925 | Kapraun. | |
| 1,980,518 | 11/1934 | Gravell | 148—6.15 |
| 2,001,754 | 5/1935 | Thompson et al. | 148—6.15 |
| 2,499,261 | 2/1950 | Rosenbloom | 117—127 |
| 2,790,739 | 4/1957 | Frederick et al. | 148—6.15 |
| 3,082,128 | 3/1963 | Craig | 123—191A XR |
| 3,104,177 | 9/1963 | Goldsmith | 117—127 XR |

RICHARD D. NEVIUS, *Primary Examiner.*

JOSEPH B. SPENCER, *Examiner.*

J. R. BATTEN, JR., *Assistant Examiner.*